US006271745B1

(12) United States Patent
Anzai et al.

(10) Patent No.: US 6,271,745 B1
(45) **Date of Patent: *Aug. 7, 2001**

(54) KEYLESS USER IDENTIFICATION AND AUTHORIZATION SYSTEM FOR A MOTOR VEHICLE

(75) Inventors: Hidehiko Anzai, Raymond, OH (US); Edward J. Castaldi, Torrance, CA (US)

(73) Assignee: Honda Giken Kogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,501

(22) Filed: Jan. 2, 1998

Related U.S. Application Data

(60) Provisional application No. 60/033,999, filed on Jan. 3, 1997.

(51) Int. Cl.[7] .................................................. H04Q 1/00

(52) U.S. Cl. ........................ 340/5.53; 340/5.72; 340/5.23; 340/5.6; 382/24

(58) Field of Search ......................... 340/825.31, 825.72, 340/825.69, 825.3, 825.32, 825.34, 426, 427, 425.5; 382/115, 24; 235/380, 382.5; 395/188.01

(56) References Cited

U.S. PATENT DOCUMENTS

| | | | | |
|---|---|---|---|---|
| 4,754,255 | * | 6/1988 | Sanders et al. | 340/64 |
| 5,559,504 | * | 9/1996 | Itsumi et al. | 340/825.3 |
| 5,650,774 | * | 7/1997 | Drori | 340/825.32 |
| 5,663,704 | * | 9/1997 | Allen et al. | 340/426 |
| 5,801,618 | * | 9/1998 | Jenkins | 340/426 |
| 5,812,067 | * | 9/1998 | Bergholz et al. | 340/825.31 |

* cited by examiner

*Primary Examiner*—Brian Zimmerman
(74) *Attorney, Agent, or Firm*—Arent Fox Kintner Plotkin & Kahn, PLLC

(57) ABSTRACT

A system for identifying the user of a vehicle and providing a level of authorization as a function of the identification of the user is disclosed. The system comprises fingerprint reading units located on the exterior and in the interior of the vehicle for scanning the fingerprint of a user of the vehicle. A control unit is coupled to the fingerprint reading unit for receiving the output of the fingerprint reading unit and for comparing and matching the scanned fingerprint with fingerprints previously enrolled in the control unit and for providing a signal indicative of a level of authorization as a function of the enrolled fingerprint with which the scanned fingerprint is matched. A vehicle locking unit is provided for enabling the operation of a plurality of vehicle locks including the ignition switch, the driver's door lock, the passenger door lock, the trunk and the glove box lock.

13 Claims, 10 Drawing Sheets

IGNITION

* USERS AUTHORIZED TO OPEN DOORS MAY NOT BE AUTHORIZED TO START ENGINE.

PURPOSE OF INTERFACE: TO LET CUSTOMERS ACCESS FINGER PRINT SYSTEM

DOOR OPENING

* USERS AUTHORIZED TO OPEN DOORS MAY NOT BE AUTHORIZED TO START ENGINE.

MODE SELECTION

ENROLL MODE

KEYLESS USER IDENTIFICATION AND AUTHORIZATION SYSTEM FOR A MOTOR VEHICLE

This application claims the benefit of U.S. Provisional Application No. 60/033,099, filed Jan. 3, 1997.

BACKGROUND OF THE INVENTION

1. Field of the Invention

The present invention is directed to a user identification and authorization system for a motor vehicle, and more particularly, to a keyless user identification and authorization system which identifies the user by a biometric identification such as a user's fingerprint, retina or voice and provides different levels of use of the vehicle, depending upon a level of authorization or enrollment entered into the system by the owner of the vehicle.

2. Description of the Prior Art

Prior art vehicle authorization systems are well known, and in particular, three types of authorization systems are used. The first type of system uses a conventional mechanical key, the second type of system uses a remote signal transmitter, and the third type of system uses a keypad which is located on the vehicle.

In the key system, the user carries a key which enables him to unlock the vehicle doors, operate the ignition switch, unlock the glove box, and unlock the trunk. If the key is lost or stolen, then the user will not have access to the vehicle. Some key systems are designed so that one key will open the doors, operate the ignition switch and lock and unlock the glove box and trunk, while other key systems are designed in which the glove box and trunk are on a separate key, or one key will operate all of the locks and another key will only operate the doors and ignition switch. In the prior art key systems, it is necessary for the operator to carry a key. Furthermore, if the owner's key operates all of the vehicle locks and the owner then gives his key to a third person, such as a driver or a valet, that person will have access to all of the vehicle locks. Still further, if the owner gives his key to a non-driver such as a child, so that the non-driver can enter the vehicle, the non-driver can then insert the key into the ignition, start the vehicle and drive the vehicle.

In the second type of prior art system using a remote signal transmitter which can activate the locks and/or ignition switch from a distance (the transmitter being referred to as a fob), it is necessary for the user to carry the transmitter or fob with him, and of course like a key, it can be lost, misplaced, or damaged. Furthermore, authorization is based upon having a particular transmitter. The system does not identify an individual. Further, as with the key system described above, if the fob is lost or stolen, then the user will not have access to the vehicle.

In the third type of prior art system, a keypad is located on the vehicle, generally on the vehicle door. The user enters a code into the keypad which will unlock the vehicle doors. However, if the user forgets the code, then he cannot get into the vehicle. Furthermore, such keypad systems operate only to unlock the vehicle door, and do not operate the vehicle ignition switch. In order to operate the ignition switch, a key is necessary.

Thus all of the prior art systems suffer from the same defects, in that they require the carrying of a key or fob which can be lost, misplaced or damaged. Furthermore, the prior art systems provide a level of access or authorization to the person who possess an object such as a key or fob. The systems do not identify a particular person.

SUMMARY OF THE INVENTION

It is the primary object of the present invention to provide a keyless vehicle operation identification and authorization system which positively identifies the owner or primary operator of the vehicle by means of a biometric characteristic of the owner or primary operator, such as a user's fingerprint, retina or voice.

It is another object of the present invention to provide a keyless vehicle operation identification and authorization system which enables different users to have different levels of authorization.

It is another object of the present invention to provide a vehicle operation identification and authorization system which identifies the user by a biometric identification such as a user's fingerprint, retina or voice, and after identifying the user, provides different levels of authorization depending upon the particular user identified.

It is still another object of the present invention to provide a vehicle operation identification and authorization system in which the vehicle owner has authorization for all vehicle operations and access to all vehicle locks and switches, and also has the ability to enroll other users at other levels of authorization for using the vehicle.

It is still another object of the present invention to provide a vehicle operation identification and authorization system in which the vehicle owner has authorization to unlock the doors, operate the ignition switch, unlock the glove box, and unlock the trunk while also having authorization to enroll others for using the vehicle.

It is still another object of the present invention to provide a vehicle operation identification and authorization system in which a driver, who is not the owner of the vehicle, can be enrolled to use the vehicle by means of scanning the user's biometric identification and once enrolled, has authorization to unlock the vehicle door, operate the ignition switch, unlock the glove box and unlock the trunk.

It is still another object of the present invention to provide a vehicle operation identification and authorization system in which the vehicle owner can enroll a user as a non-driver, and once enrolled, the user has authorization to unlock the vehicle doors, but does not have authorization to operate the ignition switch.

It is still another object of the present invention to provide for the enrollment and identification of a user by means of the users biometric identification.

It is still a further object of the present invention to provide a vehicle operation identification and authorization system in which an authorized vehicle user can place the system in a valet mode wherein the vehicle can be operated using a patterned or encoded object rather than a biometric identification.

The present invention is directed to a system for identifying the user of a vehicle and providing a level of authorization as a function of the identification of the user. The system comprises biometric identification reading units located on the exterior and in the interior of the vehicle for sensing a biometric characteristic such as the fingerprint of a user of the vehicle. A control unit is coupled to the biometric identification sensing unit for receiving the output of the biometric identification sensing unit and for comparing and matching the sensed biometric characteristic with biometric characteristics previously enrolled in the control unit and for providing a signal indicative of a level of authorization as a function of the enrolled biometric characteristic with which the scanned biometric characteristic is matched. A vehicle locking unit is provided for enabling the operation of a plurality of vehicle locks including the ignition switch, the driver's door lock, the passenger door lock, the trunk lock and the glove box lock. Various ones of the vehicle locks are unlocked based upon the level of authorization of the user who has been identified by his biometric characteristic. The system also includes a dashboard unit coupled to the control unit, the dashboard unit including a display for providing instructions and confirmations to the user, and input switches for operating various features of the system. The interior biometric characteristic sensing unit is also located in the dashboard unit. Still further, the system includes a power unit for providing power to the system. The power unit includes an interface for interfacing with the vehicle battery and an auxiliary power supply for providing power to the system when the vehicle battery does not supply sufficient power. Thus the identification system is not disabled when the vehicle battery power is low, and the vehicle can be entered by means of unlocking the doors even though battery power is low.

DETAILED DESCRIPTION OF THE PREFERRED EMBODIMENT

Figure 1:
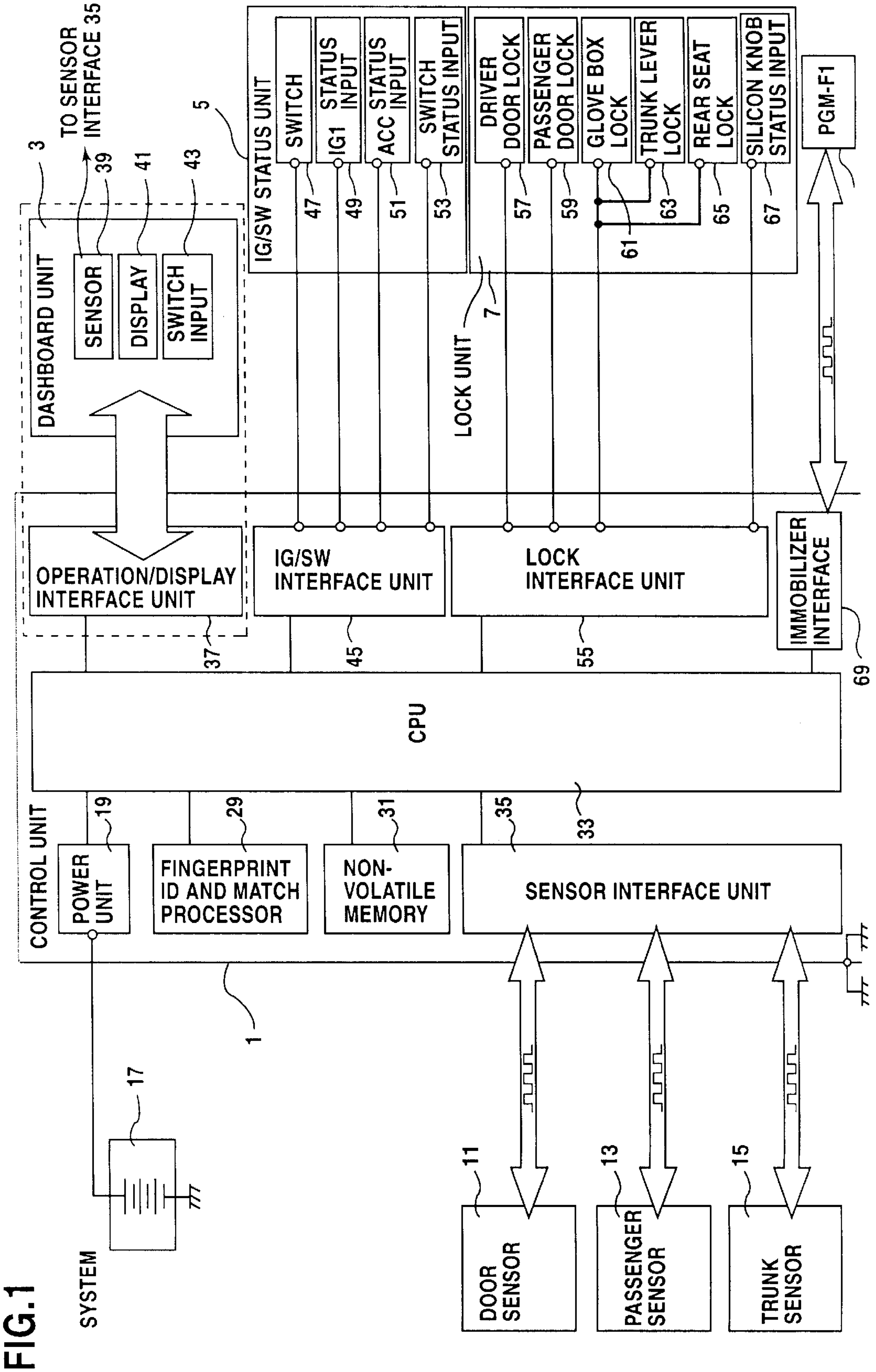
FIG. 1 is a block diagram showing a preferred embodiment of the vehicle user identification and authorization system of the present invention.

Referring to FIG. 1, the vehicle user identification and authorization system comprises a control unit 1 which is coupled to a dashboard unit 3, an ignition switch status unit 5, a vehicle lock unit 7, and a fuel control unit 9. The control unit 1 is also coupled to a fingerprint sensor 11 located on the driver side vehicle door, a fingerprint sensor 13 located in the passenger side vehicle door, and a fingerprint sensor 15 located on the vehicle trunk. The fingerprint sensors 11, 13 and 15 collect light reflected by the finger and convert it to a corresponding digital signal, such as those described in U.S. Pat. No. 4,151,512. The control unit 1 is powered by the vehicle battery 17.

Figure 2:
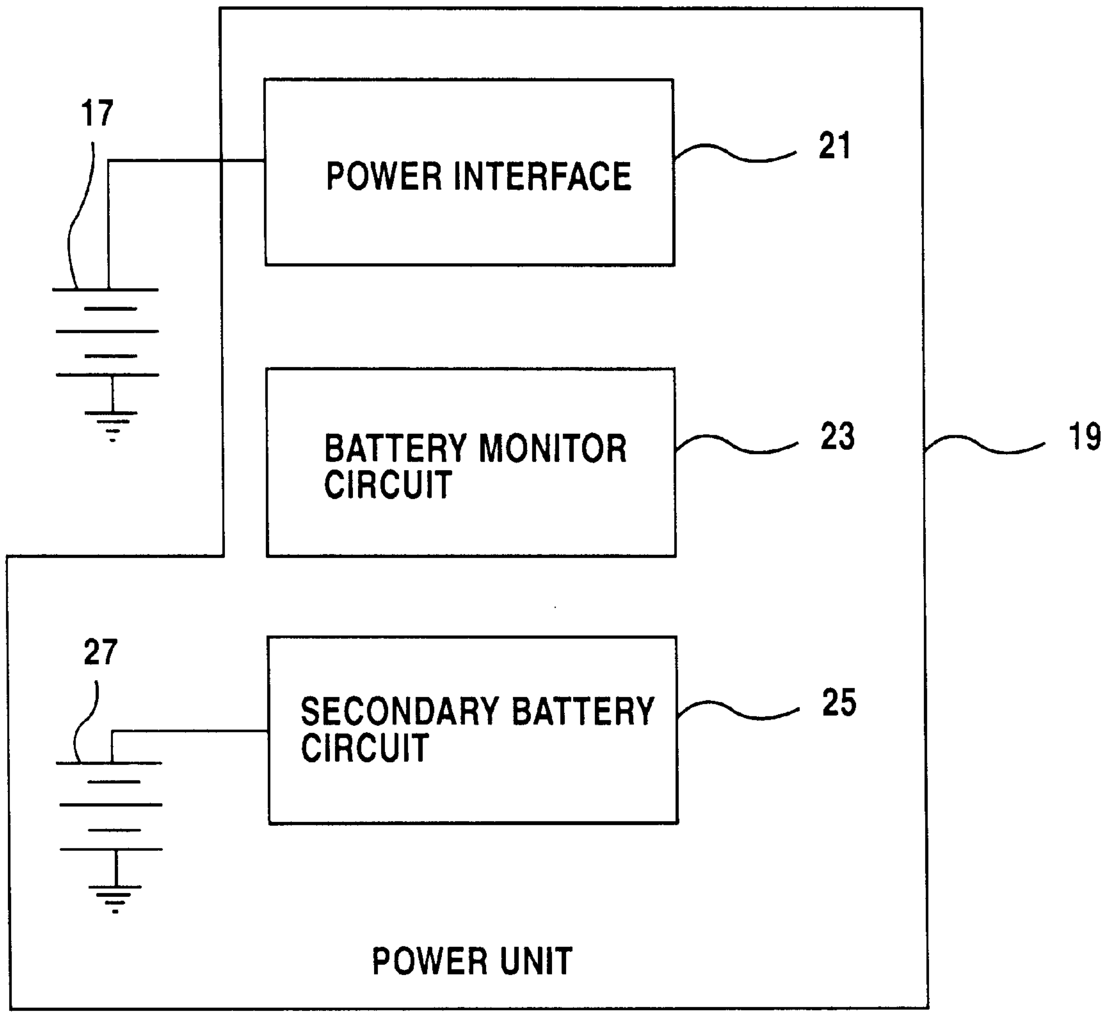
FIG. 2 is a block diagram of the power unit thereof.

Referring to FIG. 2, the control unit 1 includes a power unit 19 which is connected to the vehicle battery 17. The power unit 19 comprises a power interface 21 which interfaces the system with the vehicle battery 17; a battery monitoring circuit 23 which monitors the voltage output of the power interface 21; and a secondary battery circuit 25 which is connected to a backup battery 27. In a situation in which the vehicle battery output is low or if for some other reason the vehicle battery is not operating, such as corrosion on the terminals, etc., without a backup source of power, the identification and authorization system would become inoperable and the owner or other driver would be locked out of the vehicle because the door sensor would be inoperable. This would result in the vehicle operator not being able to access the vehicle battery under the hood, and the problem with the vehicle battery output could not be corrected. The battery monitor circuit determines when the output of the vehicle battery 17 is too low to operate the identification and authorization system, and when this occurs, the battery monitor circuit switches power to the secondary battery circuit 25 which receives power from the secondary battery 27. The secondary battery circuit provides sufficient power for the fingerprint sensor to identify the operator and to unlock the doors so that the operator can have access to the interior of the vehicle and thereby be able to open the hood so that whatever repairs are necessary can be made, in order to provide sufficient power for operating the vehicle.

The driver door sensor 11, passenger door sensor 13 and trunk sensor 15, sense the users finger and provide a signal indicative of the sensed fingerprint to the fingerprint identification and match processor 29 through sensor interface unit 35.

The control unit 1 also includes a conventional fingerprint identification and match processor 29, such as described in U.S. Pat. No. 4,151,512. The fingerprint identification and match processor receives the fingerprint data from fingerprint sensor 11 installed in the vehicle driver door, the sensor 13 in the passenger door, or the sensor 15 on the trunk, and matches the fingerprint to fingerprints stored in non-volatile memory 31. Based upon the comparison, the match processor 29 provides an output to CPU 33 which identifies which fingerprint has been matched.

The dashboard unit 3 is located in the vehicle dashboard or elsewhere in the interior of the vehicle, convenient for the use of the vehicle operator. The dashboard unit 3 is connected to the CPU 33 through an operation/display interface unit 37. The dashboard unit 3 includes a fingerprint sensor 39, a display unit 41 and a switch input 43.

Figure 3:
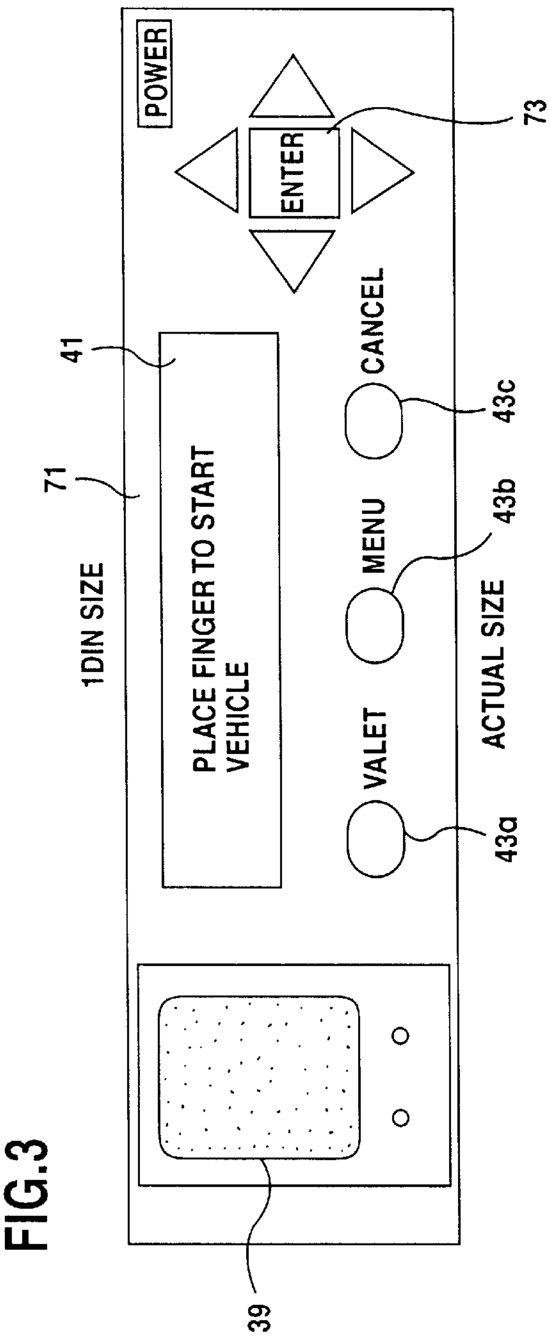
FIG. 3 shows the panel of the dashboard unit for the system.

The front panel 71 of the dashboard unit 3 is shown in FIG. 3. The panel includes display unit 41, fingerprint sensor 39 and switches 43*a*, 43*b* and 43*c* which form the switch input unit 43. The panel also includes a cursor unit 73 for scrolling information shown on display unit 41.

Since the system is keyless, a switch located inside the vehicle is provided to switch the power on and off to the ignition and accessories. When a proper authorization is provided by the CPU based upon the fingerprint of the user, the switch is enabled.

The ignition switch status unit 5 includes a steering wheel lock unit 47 which has a solenoid for locking and unlocking the steering wheel; an ignition switch status input unit 49 which provides a signal when the switch is in the ignition position; and an accessory switch status input unit 51 which provides a signal when the switch is in the accessory position. Further, the ignition switch status unit includes a switch status input unit 53 which provides a signal when the switch is in the ignition position which corresponds to leaving the key in the ignition when exiting the vehicle.

The ignition switch unit 5 is connected to CPU 33 through ignition switch interface unit 45.

Lock unit 7 is connected to CPU 33 through lock interface unit 55. When the fingerprint of the user is matched and a proper authorization is determined by CPU 33, an appropriate signal is provided to the lock unit 7 through interface 55, which unlocks various vehicle locks dependent upon the authorization of the user. In particular, lock unit 7 will unlock the driver door lock 57, the passenger door lock 59 and the glove box, trunk and rear seat door locks 61, 63 and 65. Lock status device 67 provides an indication of the status of each of the locks 57–65.

CPU 33 is also connected to the engine immobilizer unit 9, such as shown in U.S. Pat. No. 4,148,372, through immobilizer interface 69. The engine immobilizer unit 9 can enable or disable one or all of the starter motor, ignition system, and fuel supply until proper authorization of the user is determined based upon the user's fingerprint, the fuel system of the vehicle is disabled so that even if the ignition switch is bypassed by an unauthorized user, the vehicle will still not operate because no fuel is provided to the engine.

In the embodiment shown in FIG. 1, the driver door sensor, passenger door sensor and trunk sensor, all apply sensed fingerprint signals to control unit 1 and the control unit 1 includes the fingerprint ID and match processor, the non-volatile memory and the CPU for comparing the sensed fingerprint with the fingerprints stored in the non-volatile memory in order to determine the authorized level of access of the user. In the embodiment shown in FIG. 1*a*, a separate fingerprint ID and match processor and non-volatile memory is associated with each sensor, and the determination of the authorized level of access is made within each control unit. The authorized level of access signal from each of the control units is then applied to the CPU which uses this signal to generate various corresponding outputs.

Figure 1A:
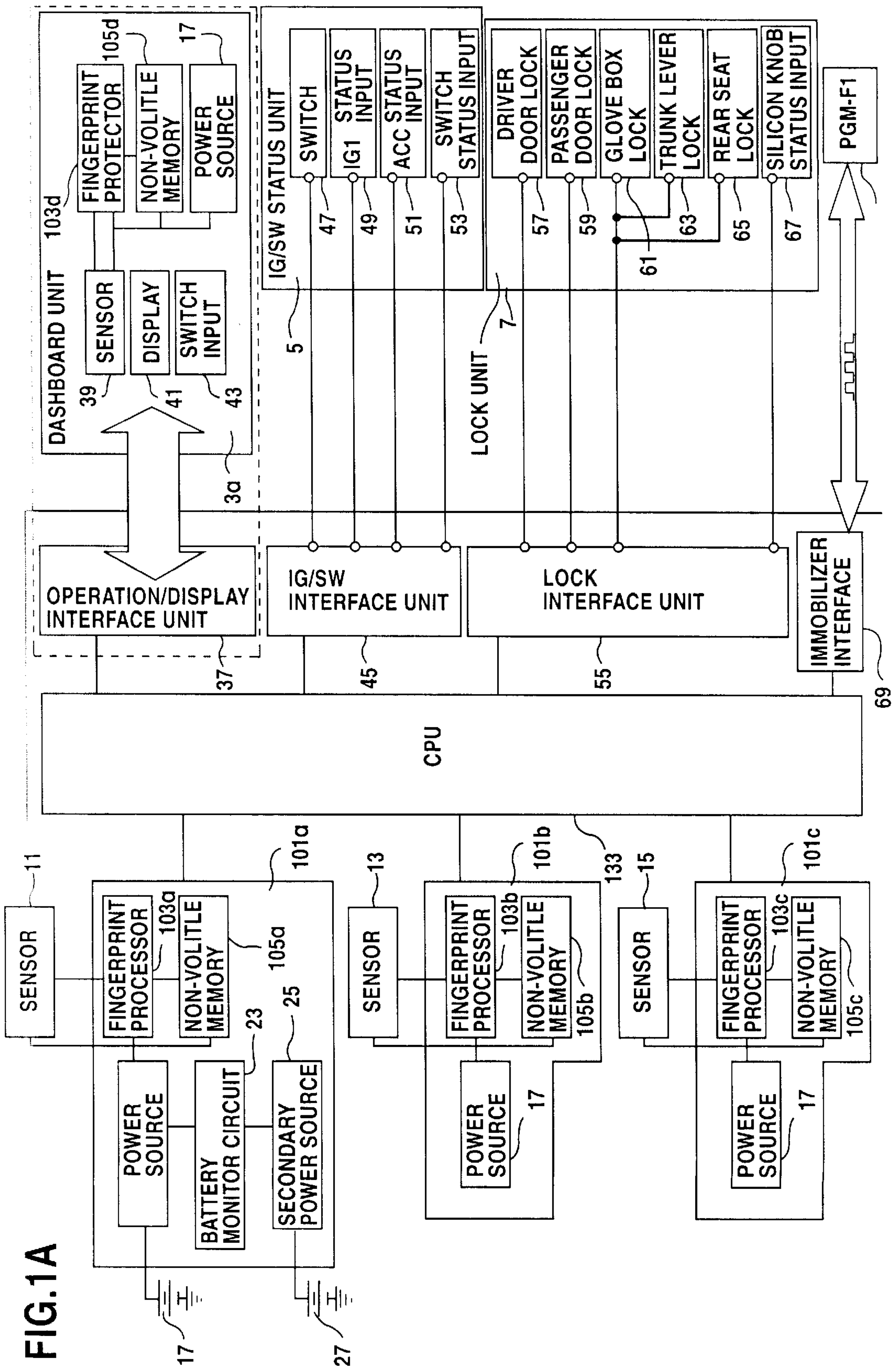
FIG. 1*a* is a block diagram showing a second embodiment of the vehicle user identification and authorization system of the present invention.

Referring to FIG. 1*a*, the vehicle user identification authorization system comprises a plurality of control units 101*a*, 101*b* and 101*c* which are coupled to CPU 133. CPU 133 is also coupled to a dashboard unit 3*a*, an ignition switch status unit 5, a vehicle lock unit 7, and a fuel control unit 9. Control unit 101*a* is coupled to a fingerprint sensor 11 located on the vehicle driver door. Control unit 101*b* is coupled to a fingerprint sensor 13 located in the passenger door of the vehicle, fingerprint sensor 15 is located on the vehicle trunk, and fingerprint sensor 39 is located in dashboard unit 3*a*. The control units 101*a*, 101*b* and 101*c* and dashboard unit 3*a* are all powered by the vehicle battery 17. Control unit 101*a* includes a power interface 21, battery monitor circuit 23 and secondary power source 25 which are the same as described above in connection with FIG. 2. In an alternative embodiment, the power unit of FIG. 2 can be coupled to all of the control units and the dashboard unit.

The door sensor 11 senses the user's finger and provides a signal to fingerprint ID and match processor 103*a*. Fingerprint processor 103*a* compares the sensed fingerprint to fingerprints stored in non-volatile memory 105*a*, and if the sensed fingerprint is matched to one of the stored user fingerprints, a predetermined level of access is given to the user. The signal indicative of the access level of the user is applied to CPU 133 which then sends out a corresponding control signal to operation/display interface unit 37, ignition switch interface 45, lock interface unit 55 and immobilizer interface 69.

Sensor 13, which is located in the passenger door of the vehicle, senses the user's fingerprint and applies a signal to fingerprint ID and match processor 103*b* which compares this signal to the fingerprint signals stored in non-volatile memory 105*b*. Based upon the comparison, the fingerprint processor 103*b* produces a user access signal which is applied to computer 133. Based upon the user's access level, CPU 133 provides an appropriate control signal.

Sensor 15 which is located in or near the vehicle trunk lid, senses the user's fingerprint and applies a signal to fingerprint ID and match processor 103*c* which compares this signal to the fingerprint signals stored in non-volatile memory 105*c*. Based upon the comparison, the fingerprint processor 103*c* produces a user access signal which is applied to computer 133. Based upon the user's access level, CPU 133 provides an appropriate control signal to lock interface unit 31.

Similarly, sensor 39 which is located in the passenger compartment on the dashboard, senses the user's fingerprint and applies a corresponding signal to fingerprint ID and match processor 103*d* which compares the sensed fingerprint with fingerprints stored in non-volatile memory 105*d*. Based upon the comparison, a user access level signal is provided from dashboard unit 3*a* to CPU 133 which provides control signals to operation display interface unit 37, ignition switch interface unit 45, lock interface unit 55, and immobilizer interface 69 based upon the authorized level of access of the user.

Figure 5:
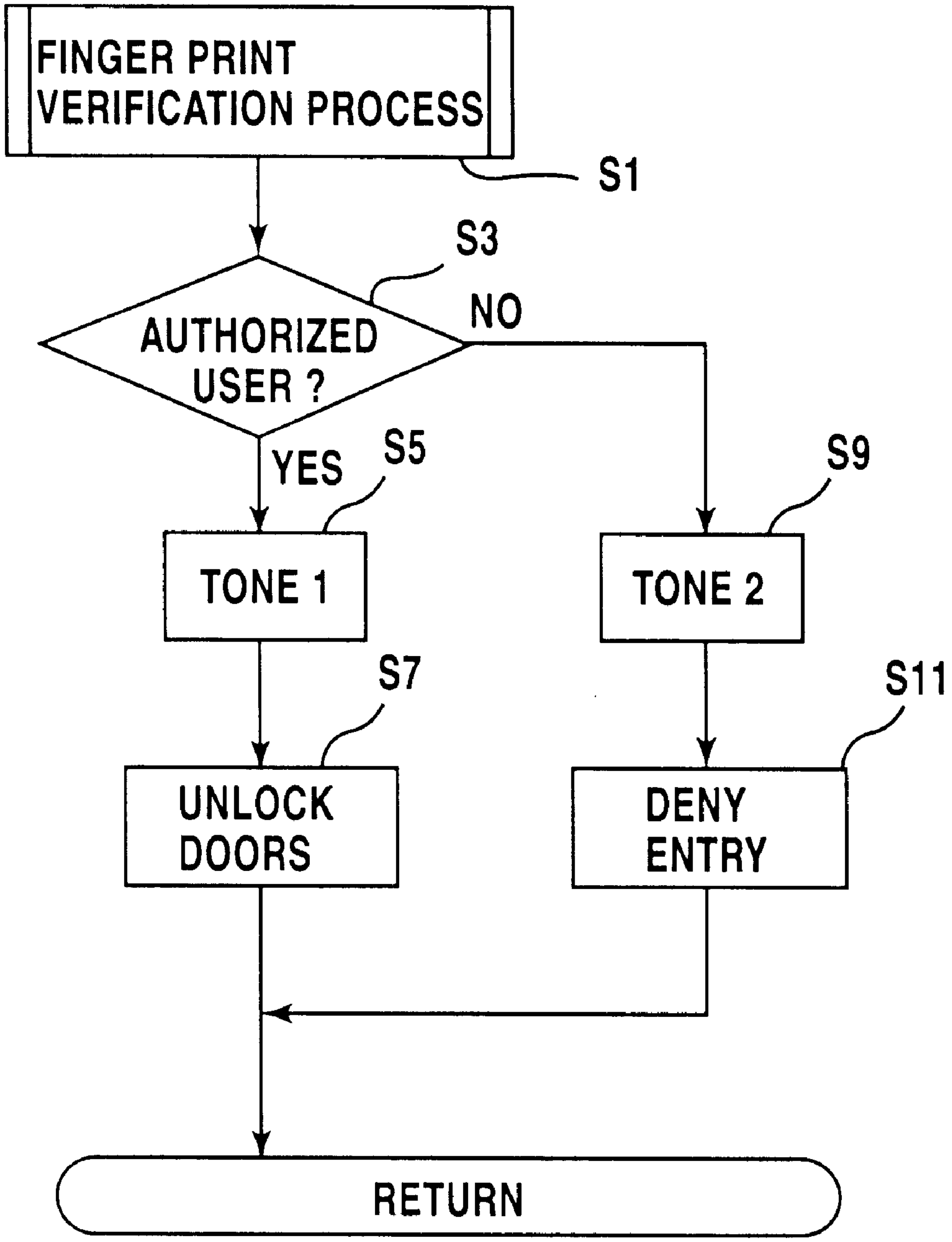
FIG. 5 is a flow chart showing the operation of the door opening mode of the system.

FIG. 5 is a flow chart of the door opening operation of the vehicle. In Step S1, the user inserts his finger into door sensor 11, which scans his fingerprint and applies it to fingerprint identification and match processor 29. The processor 29 and CPU 33 determine whether the user is authorized at Step S3. If the user is authorized, a first tone is provided at Step S5 and the vehicle doors are unlocked at Step S7. If at Step S3 it is determined that the user is not authorized, then a second tone is generated at Step S9 and entry is denied at Step S11. The system then returns to its initial condition.

Figure 6:
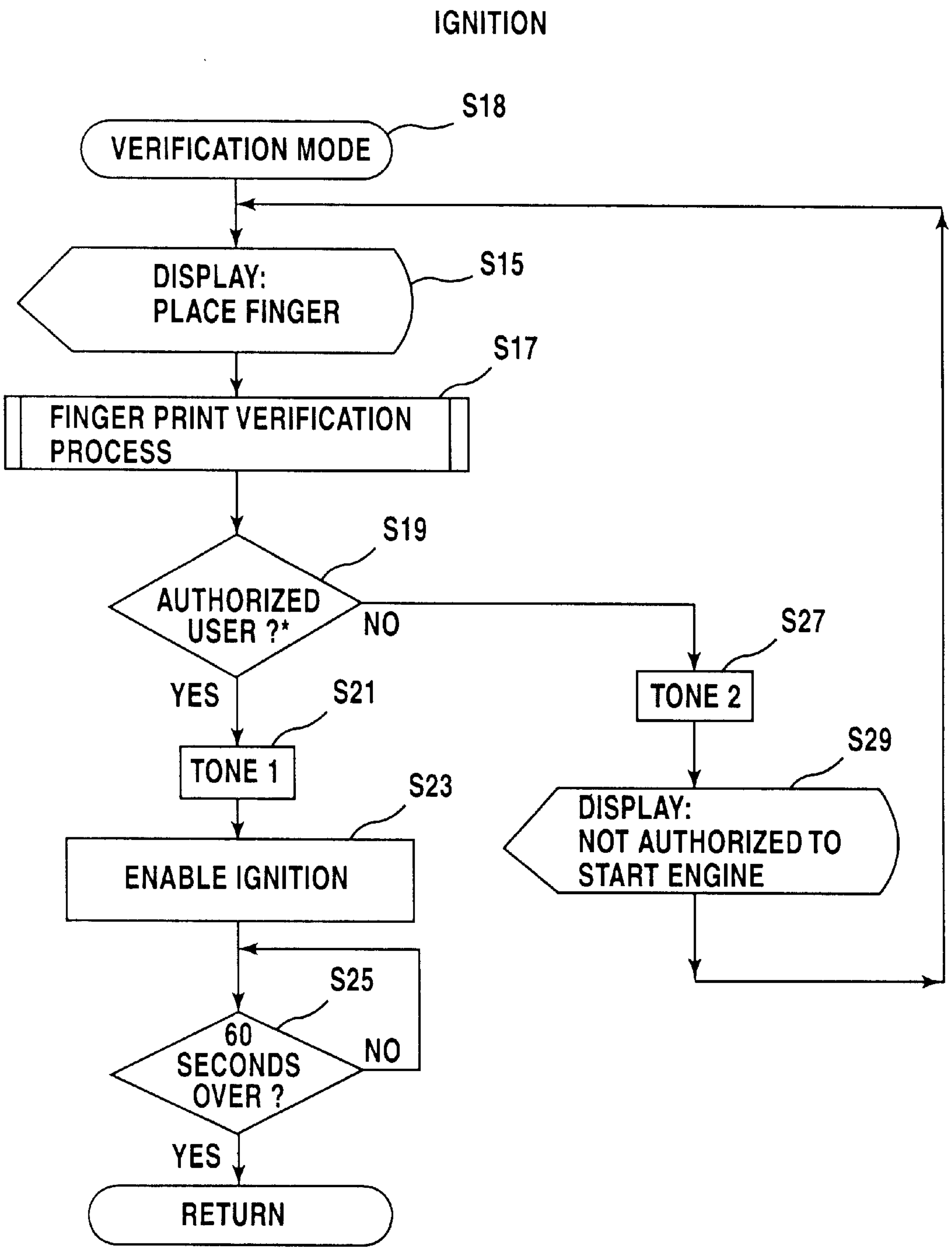
FIG. 6 is a flow chart showing the operation of the system in the vehicle ignition mode.

FIG. 6 illustrates the flow chart for operating the vehicle ignition. After entering the vehicle following the unlocking of the doors, the display unit 41 on the dashboard unit 3 provides an indication instructing the user to place his finger in the fingerprint sensor 39 at Step S15. As Step S17, the fingerprint is verified in the fingerprint identification and match processor 29 and CPU 33 and its is determined whether the user is authorized at Step S19. A user who is authorized to open the vehicle door may not be authorized to operate the ignition. An example of such a person would be a non-driver such as a child, where the owner of the vehicle could give the non-driver access to the interior of the vehicle without authorizing them to operate the vehicle. If at Step S19 it is determined that the user is authorized to operate the ignition, a first tone is provided at Step S21, and the ignition is enabled at Step S23, so that the user can operate an ignition switch to start the vehicle. A sixty second period for starting the vehicle is provided at Step S25, and if the vehicle is not started within this sixty second period, then the user must go through the authorization process again. Another person could enter the vehicle and start the ignition. If at Step S19 it is determined that the user is not authorized to start the vehicle, then a second tone is provided at Step S27 and the display unit 41 provides an indication that the user is not authorized to start the vehicle at Step S29.

Figure 4:
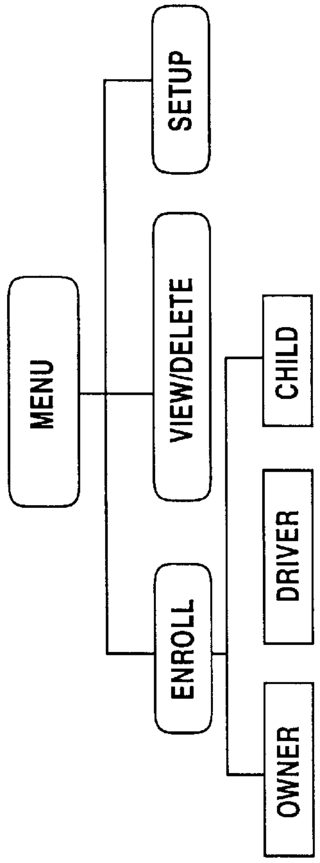
FIG. 4 shows the various functions which the system performs when in the menu mode of operation.

The dashboard unit 3, in addition to displaying whether a user is authorized or not to start the ignition, has the additional function of providing an input to the system for other features of the system. One input is the menu mode which enables the vehicle owner to enroll various users and provide them with different levels of authorization, to view authorizations within the system, or to delete various authorizations. The menu mode is also used to set up the system. The functions of the menu mode are shown in FIG. 4. In addition, the dashboard unit provides an input to operate the system in a valet mode to be discussed below.

Figure 7:
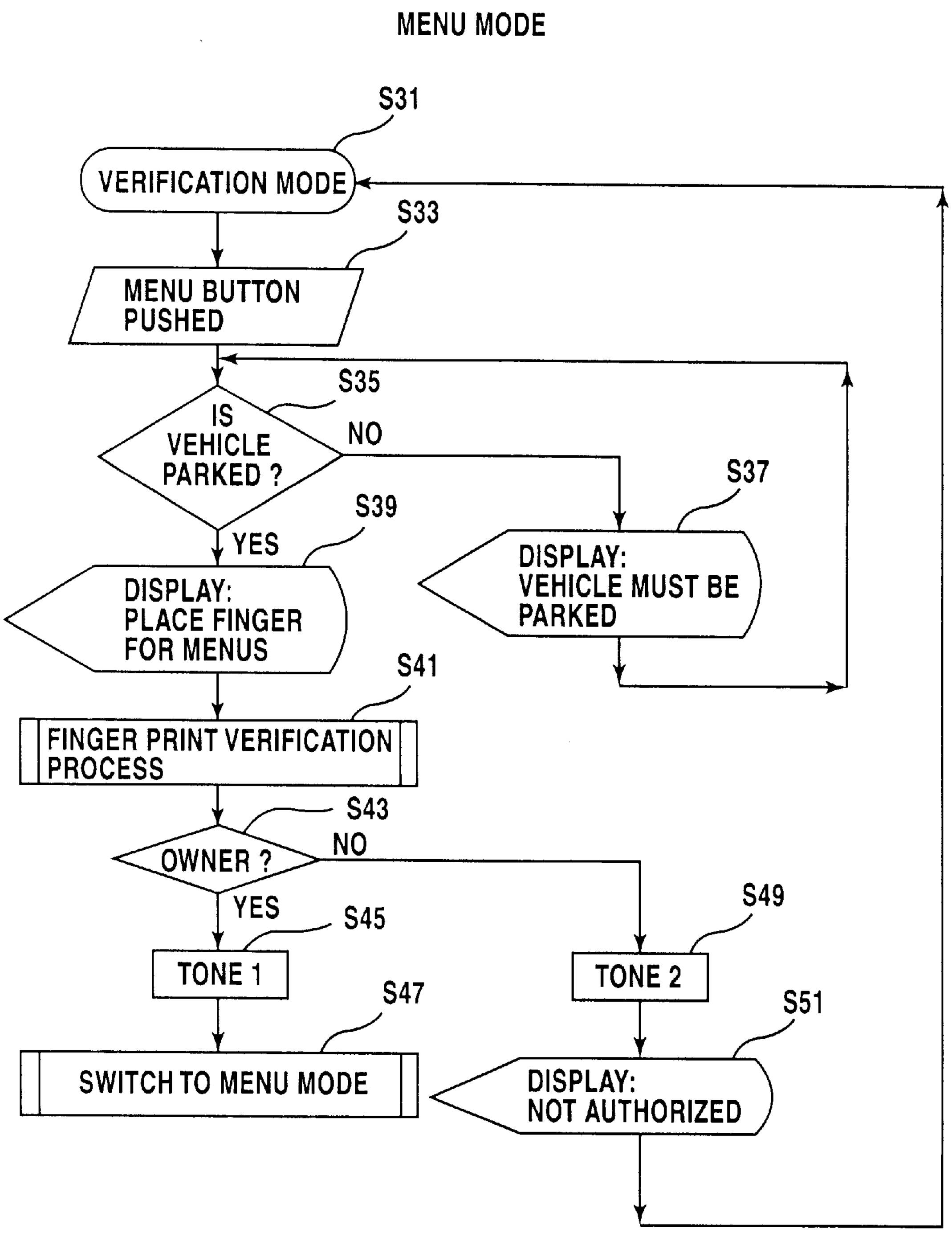
FIG. 7 is a flow chart of the menu mode of operation for the system.

FIG. 7 is a flow chart showing the operation of the system in the menu mode. Once inside the vehicle, the verification mode begins at Step S31 and the menu button of switch input 43 is operated at Step S33. At Step S35, it is determined if a vehicle is parked, and if it is not parked, at Step S37, display unit 41 indicates that the vehicle must be parked in order to proceed in the menu mode. If the vehicle is parked, then at Step S41, display unit 41 indicates that the user's finger must be placed in the fingerprint sensor 39. The fingerprint is then scanned and a signal indicative of the fingerprint is applied to the control unit 1, where the authorization level of the fingerprint is determined in the verification process at Step S43. At Step S43, it is determined if the user is the owner, since the owner is the only individual authorized to enroll other individuals, delete individuals or to set up the system. If at Step S43 it is determined that the user is the owner, then a first tone is provided at Step S45, and the dashboard unit switches to the menu mode at Step S47. If it is determined that the user is not the owner, then a second tone is provided at Step S49, and at Step S51, the display indicates that the user is not authorized to operate the system in the menu mode.

Figure 8:
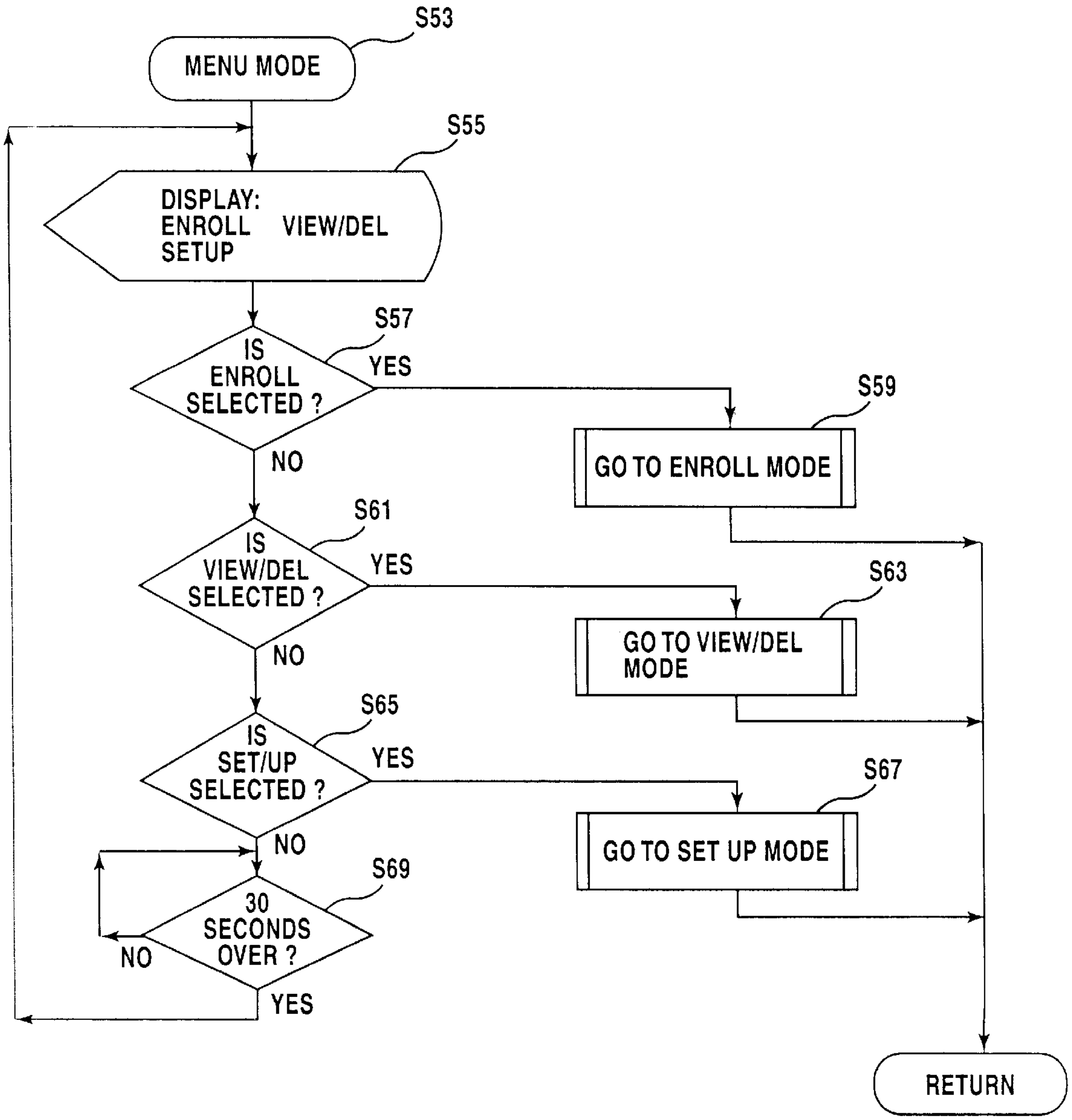
FIG. 8 is a flow chart for the mode selection operation of the system.

FIG. 8 is a flow chart showing the operation of mode selection within the menu mode. At Step S53, the system is placed in the menu mode and the display unit 41 displays the three modes of operation-enroll, view/delete, and setup, at Step S55. At Step S57, it is determined if the enroll mode is selected, and if selected, the system goes to the enroll mode at Step S59. If the enroll mode is not selected, then at Step S61, it is determined if the view/delete mode is selected, and if it is selected, the system goes to the view/delete mode at Step S63. If the view/delete mode is not selected, then at Step S65, it is determined if the setup mode has been selected, and if it has been selected, the system goes to the setup mode at Step S67. If neither the enroll mode, view/delete mode nor setup mode are selected within thirty seconds, then at Step S69, the system returns to the beginning of mode selection.

Figure 9:
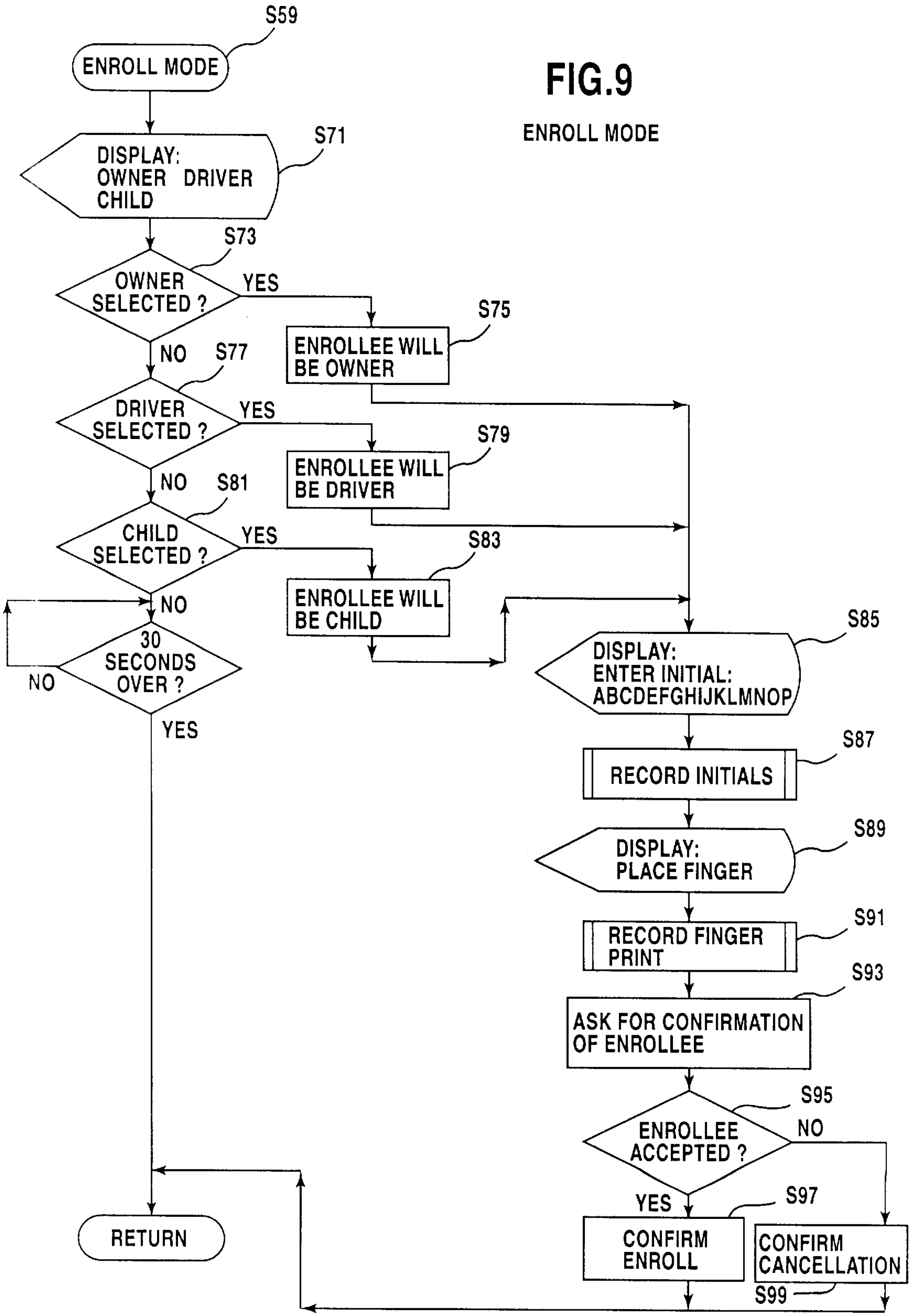
FIG. 9 is flow chart of the enroll mode of operation for the system.

FIG. 9 is a flow chart of the enroll mode. Referring to FIG. 8, if the enroll mode is selected at Step S71, the display provides an indication of the three categories of authorization, owner, driver, and non-driver. At Step S73, it is determined if the owner is selected, and if the owner is selected, then at Step S75, it is determined that the enrollee will be an owner. If the owner is not selected, then at Step S77, it is determined if the driver category is selected, and if a driver category is selected, then at Step S79, it is indicated that the enrollee will be a driver. If at Step S77 it is determined that a driver category is not selected, then at Step S81, it is determined if the non-driver category is selected. If the non-driver category is selected, then at Step S83, it is indicated that a non-driver will be enrolled. Once the category of the enrollee has been determined at Step S85, the display unit 41 will provide an instruction to enter initials. The initials are entered using the scroll key 73. The initials entered will be recorded at Step S87 and Step S89, the display will then provide indication for the enrollee to place his finger on the fingerprint sensor 39 in dashboard unit 3. The fingerprint is scanned and recorded at Step S91, and the system asks for a confirmation at Step S93. If in response to the request for confirmation at Step S93 the enrollee is accepted, at Step S95, confirmation of enrollment is confirmed at Step S97. If the enrollee is not to be accepted, the cancellation is confirmed at Step S99.

Figure 10:
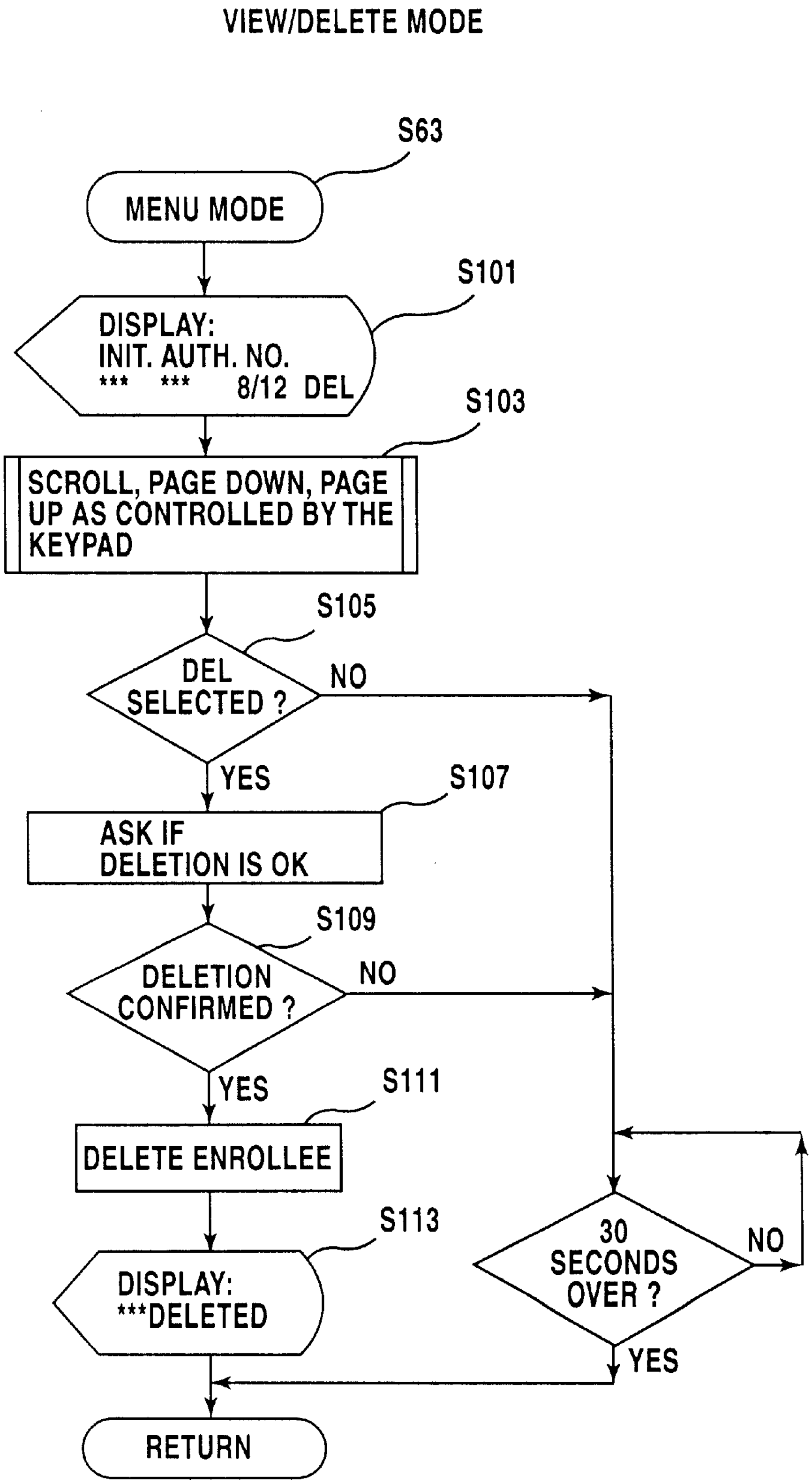
FIG. 10 is a flow chart of the view/delete mode of operation of the system.

If the owner has selected the view/delete mode, then a Step S63 the system goes to the view/delete mode, the flow chart of which is illustrated in FIG. 10. At Step S101, display unit 41 provides an indication of the initials and category of authorization for each system enrollee. At Step S103, the display may be scrolled up and down by use of the scroll keys 73 of the dashboard unit. At Step S105, it is determined whether the enrollee displayed at Step S101 is to be deleted. If the enrollee is to be deleted at Step S107, the owner indicates deletion using scroll keys 73 and the system asks whether deletion is okay, and deletion is confirmed at Step S109. If deletion is confirmed at Step S109, then at Step S111 the enrollee is deleted, and at Step S113, the display indicates the initials of the enrollee and the word "Deleted". If at Step S105 deletion has not been selected for a period of thirty seconds, the system then returns to the previous mode of operation.

The system includes a mode of operation referred to as a valet mode. When the vehicle is left with a parking attendant or valet, it is necessary to provide the parking attendant with some means to operate the vehicle without the necessity for taking the parking attendant's fingerprint and entering it into the system. Furthermore, as is very often the case, the parking attendant who parks a vehicle is not the same attendant who retrieves the vehicle. In order to provide for the operation of the vehicle in the situation, when the vehicle is turned over to a valet, the owner or driver selects the valet mode and the valet is given a device, such as a card, with a pattern representing a fingerprint. This pattern will only provide authorization for operating the vehicle and will not authorize the unlocking of the glove box or trunk. Furthermore, the pattern will only provide authorization for a limited period of time or until it is cancelled by the vehicle owner or driver.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A system for identifying a user of a vehicle and providing a level of authorization for the operation of a plurality of vehicle locks as a function of the identification, said system comprising:

(a) at least two fingerprint reading means for scanning the fingerprint of a user of the vehicle wherein at least one of said fingerprint reading means is located on the exterior of the vehicle and at least one of said fingerprint reading means is located in the interior of the vehicle;

(b) control means coupled to said fingerprint reading means for receiving the output thereof and for comparing and matching the scanned fingerprint with fingerprints previously enrolled therein and for providing a signal indicative of a level of authorization as a function of the enrolled fingerprint with which the scanned fingerprint is matched, wherein more vehicle lock operations are authorized by the fingerprint reading means in the interior of the vehicle than by the fingerprint reading means on the exterior of the vehicle and wherein only the interior fingerprint reading means can authorize starting the vehicle; and (c) vehicle lock means for enabling and disabling the operation of a plurality of vehicle locks, wherein the output of said control means is coupled to said vehicle lock means and wherein the vehicle lock operations are enabled and disabled as a function of the level of authorization of the user.

2. A system for identifying and authorizing the user of a vehicle as claimed in claim 1, wherein said control means includes power unit means for providing power to the system, said power unit means including interface means for interfacing with the vehicle battery and an auxiliary power means for providing power to the system when the vehicle battery does not supply sufficient power.

3. A system for identifying and authorizing the user of a vehicle as claimed in claim 1, wherein at least one of the fingerprint reading means located on the exterior of the vehicle is located on the driver's door of the vehicle and at least one of the fingerprint reading means located in the interior of the vehicle is located on the vehicle dashboard in the passenger compartment.

4. A system for identifying and authorizing the user of a vehicle as claimed in claim 1, wherein said system includes a dashboard unit coupled to said control means, said dashboard unit including a display means, input switch means; and said interior fingerprint reading means.

5. A system for identifying and authorizing the user of a vehicle as claimed in claim 1, wherein said vehicle lock means enables the operation of at least one of the vehicle ignition switch, the driver door lock, the passenger door lock, the trunk lock and the glove box lock.

6. A system for identifying a user of a vehicle and providing a level of authorization for the operation of a plurality of vehicle locks as a function of the identification, said system comprising:

(a) at least one fingerprint reading device for scanning the fingerprint of a user of the vehicle;

(b) control means coupled to said fingerprint reading device for receiving the output thereof and for comparing and matching the scanned fingerprint with fingerprints previously enrolled therein and for providing a signal indicative of a level of authorization as a function of the enrolled fingerprint with which the scanned fingerprint is matched;

(c) vehicle lock apparatus for enabling and disabling the operation of a plurality of vehicle locks, wherein the output of said control means is coupled to said vehicle lock apparatus and wherein the vehicle lock operations are enabled or disabled as a function of the level of authorization of the user; and (d) a valet device having a pattern thereon corresponding to a fingerprint for insertion and reading by said fingerprint reader device, wherein when said valet device is inserted in said fingerprint reading device, a predetermined level of authorizing is given to the user.

7. A system for identifying a user of a vehicle and providing a level of authorization for the operation of a plurality of vehicle locks as a function of the identification, said system comprising:

(a) at least one fingerprint reading means for scanning the fingerprint of a user of the vehicle;

(b) control means coupled to said fingerprint reading means for receiving the output thereof and for comparing and matching the scanned fingerprint with fingerprints previously enrolled therein and for providing a signal indicative of a level of authorization as a function of the enrolled fingerprint with which the scanned fingerprint is matched;

(c) vehicle lock means for enabling and disabling the operation of a plurality of vehicle locks, wherein the output of said control means is coupled to said vehicle lock means and wherein the vehicle lock operations are enabled or disabled as a function of the level of authorization of the user; and (d) valet means having a pattern thereon corresponding to a fingerprint for insertion and reading by said fingerprint reader means, wherein when said valet means is inserted in said fingerprint reading means, a predetermined level of authorizing is given to the user.

8. A system for identifying a user of a vehicle and providing a level of authorization for the operation of a plurality of vehicle locks as a function of the identification, said system comprising:

(a) at least two fingerprint reading devices for scanning the fingerprint of a user of the vehicle wherein at least one of said fingerprint reading devices is located on the exterior of the vehicle and at least one of said fingerprint reading devices is located in the interior of the vehicle;

(b) control means coupled to said fingerprint reading devices for receiving the output thereof and for comparing and matching the scanned fingerprint with fingerprints previously enrolled therein and for providing a signal indicative of a level of authorization as a function of the enrolled fingerprint with which the scanned fingerprint is matched, wherein more vehicle lock operations are authorized by the fingerprint reading devices in the interior of the vehicle than by the fingerprint reading devices on the exterior of the vehicle and wherein only the interior fingerprint reading means can authorize starting the vehicle; and (c) vehicle lock apparatus for enabling and disabling the operation of a plurality of vehicle locks, wherein the output of said control means is coupled to said vehicle lock apparatus and wherein the vehicle lock operations are enabled and disabled as a function of the level of authorization of the user.

9. A system for identifying and authorizing the user of a vehicle as claimed in claim 8, wherein said control means includes power unit means for providing power to the system, said power unit including an interface for interfacing with the vehicle battery and an auxiliary power device for providing power to the system when the vehicle battery does not supply sufficient power.

10. A system for identifying and authorizing the user of a vehicle as claimed in claim 8, wherein said system includes a valet device having a pattern thereon corresponding to a fingerprint, wherein when said valet device is inserted in said fingerprint reading devices, a predetermined level of authorizing is given to the user.

11. A system for identifying and authorizing the user of a vehicle as claimed in claim 8, wherein at least one of the fingerprint reading device located on the exterior of the vehicle is located on the driver's door of the vehicle and at least one of the fingerprint reading device located in the interior of the vehicle is located on the vehicle dashboard in the passenger compartment.

12. A system for identifying and authorizing the user of a vehicle as claimed in claim 8, wherein said system includes a dashboard unit coupled to said control means, said dashboard unit including a display, input switch; and said interior fingerprint reading devices.

13. A system for identifying and authorizing the user of a vehicle as claimed in claim 8, wherein said vehicle lock apparatus enables the operation of at least one of the vehicle ignition switch, the driver door lock, the passenger door lock, the trunk lock and the glove box lock.

* * * * *